(12) United States Patent
Carrington

(10) Patent No.: US 11,833,938 B1
(45) Date of Patent: Dec. 5, 2023

(54) CHILD SAFETY SEAT

(71) Applicant: Sherman Carrington, Yonkers, NY (US)

(72) Inventor: Sherman Carrington, Yonkers, NY (US)

( * ) Notice: Subject to any disclaimer, the term of this patent is extended or adjusted under 35 U.S.C. 154(b) by 0 days.

(21) Appl. No.: 17/833,992

(22) Filed: Jun. 7, 2022

(51) Int. Cl.
*B60N 2/28* (2006.01)

(52) U.S. Cl.
CPC ......... *B60N 2/2806* (2013.01); *B60N 2/2845* (2013.01); *B60N 2/2857* (2013.01)

(58) Field of Classification Search
CPC .. B60N 2/2806; B60N 2/2845; B60N 2/2857; B60N 2/2821
USPC ................................. 297/256.11
See application file for complete search history.

(56) References Cited

U.S. PATENT DOCUMENTS

| | | | |
|---|---|---|---|
| 4,998,307 A * | 3/1991 | Cone | B60N 2/2854 297/256.13 |
| 6,042,181 A | 3/2000 | Goor | |
| 6,196,629 B1 | 3/2001 | Onishi | |
| 6,237,999 B1 | 5/2001 | Hobson | |
| 8,061,768 B2 | 11/2011 | Amirault | |
| D851,948 S | 6/2019 | Imrich | |
| 10,457,168 B2 | 10/2019 | Anderson | |
| 2002/0043836 A1 | 4/2002 | Maciejczyk | |
| 2002/0163232 A1 | 11/2002 | Vezinet | |
| 2016/0023579 A1* | 1/2016 | Balensiefer, II | B60N 2/265 297/250.1 |

FOREIGN PATENT DOCUMENTS

| | | | |
|---|---|---|---|
| CN | 205395825 U | * | 7/2016 |
| WO | 2002008013 | | 1/2002 |

* cited by examiner

*Primary Examiner* — Milton Nelson, Jr.

(57) ABSTRACT

The child safety seat is a safety device. The child safety seat is used with an automobile. The child safety seat is adapted for use by a client. The client sits in the child safety seat when traveling as a passenger in the automobile. The child safety seat protects the client from injury when the automobile is involved in an unfortunate event. The child safety seat mounts in the automobile such that the transverse direction of the child safety seat is parallel to the coronal direction of the automobile. The child safety seat comprises a protective structure, a pedestal structure, an anchor structure, and the automobile. The pedestal structure attaches to the protective structure. The anchor structure secures the protective structure to the automobile. The protective structure forms a protected space in which the client sits. The pedestal structure adjusts the elevation of the protective structure.

12 Claims, 9 Drawing Sheets

CHILD SAFETY SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of seats mounted in vehicles including seats readily mountable on, and dismountable from, existing seats of the vehicle with protection systems against abnormal g-forces. (B60N2/2884)

SUMMARY OF INVENTION

The child safety seat is a safety device. The child safety seat is used with an automobile. The child safety seat is adapted for use by a client. The client is assumed to be a child, such as an infant or a toddler. The client sits in the child safety seat when traveling as a passenger in the automobile. The child safety seat protects the client from injury when the automobile is involved in an unfortunate event. The child safety seat mounts in the automobile such that the transverse direction of the child safety seat is parallel to the coronal direction of the automobile. The child safety seat comprises a protective structure, a pedestal structure, an anchor structure, and the automobile. The pedestal structure attaches to the protective structure. The anchor structure secures the protective structure to the automobile. The protective structure forms a protected space in which the client sits. The pedestal structure adjusts the elevation of the protective structure.

These together with additional objects, features and advantages of the child safety seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the child safety seat in detail, it is to be understood that the child safety seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child safety seat.

It is therefore important that the claims be regarded as including such equivalent construction insofar as they do not depart from the spirit and scope of the child safety seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
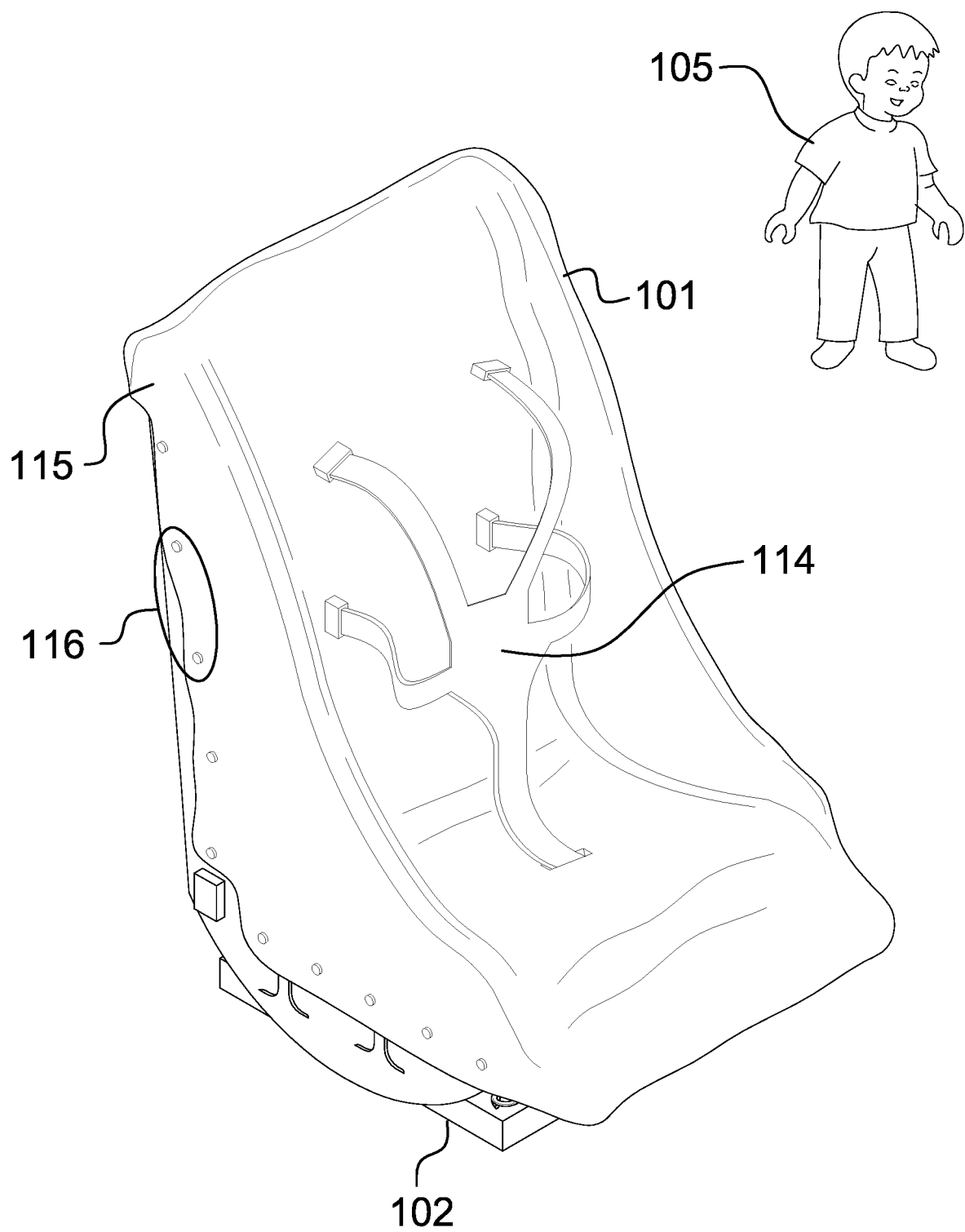
FIG. 1 is a perspective view of an embodiment of the disclosure.
Figure 2:
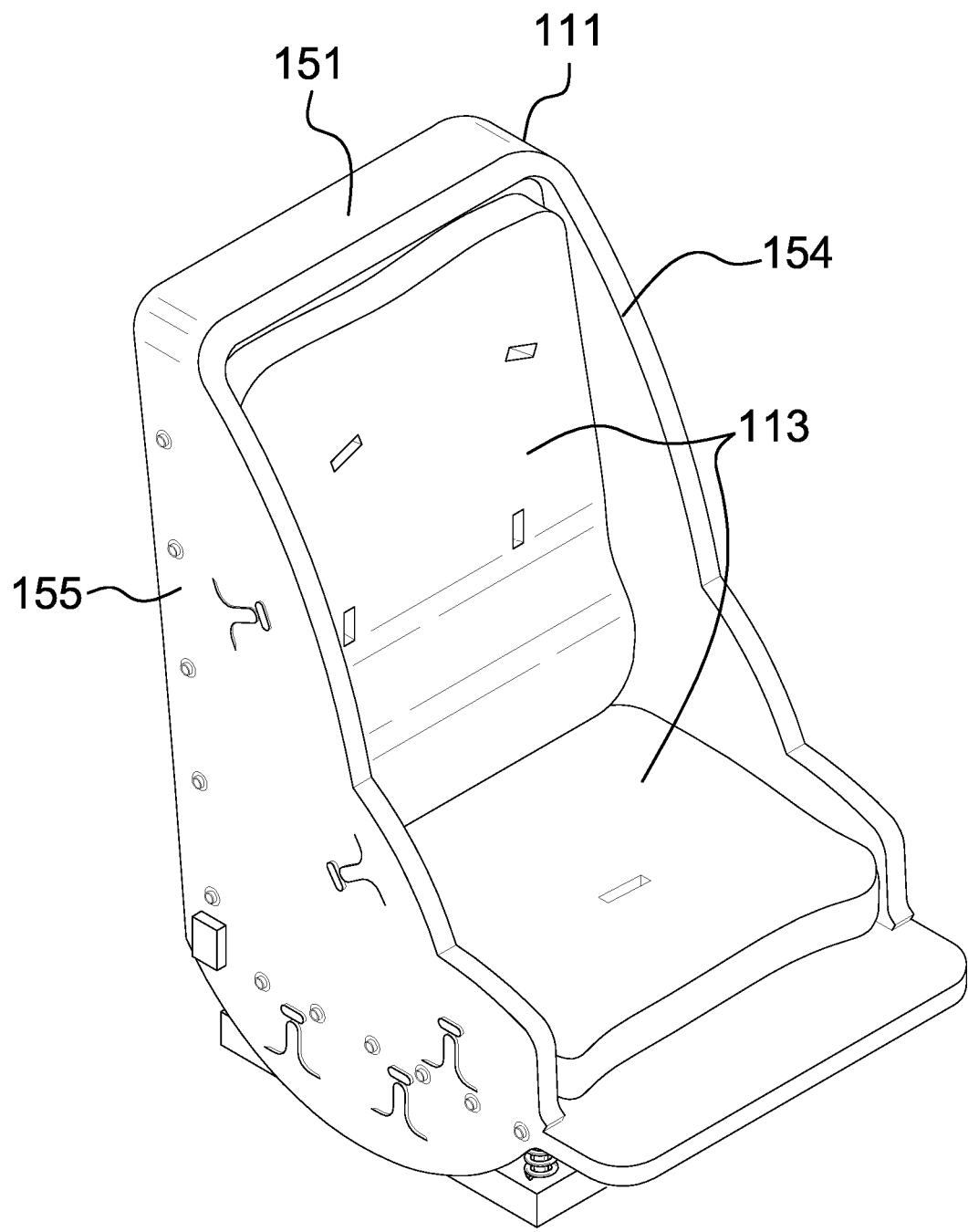
FIG. 2 is a perspective view of an embodiment of the disclosure.
Figure 3:
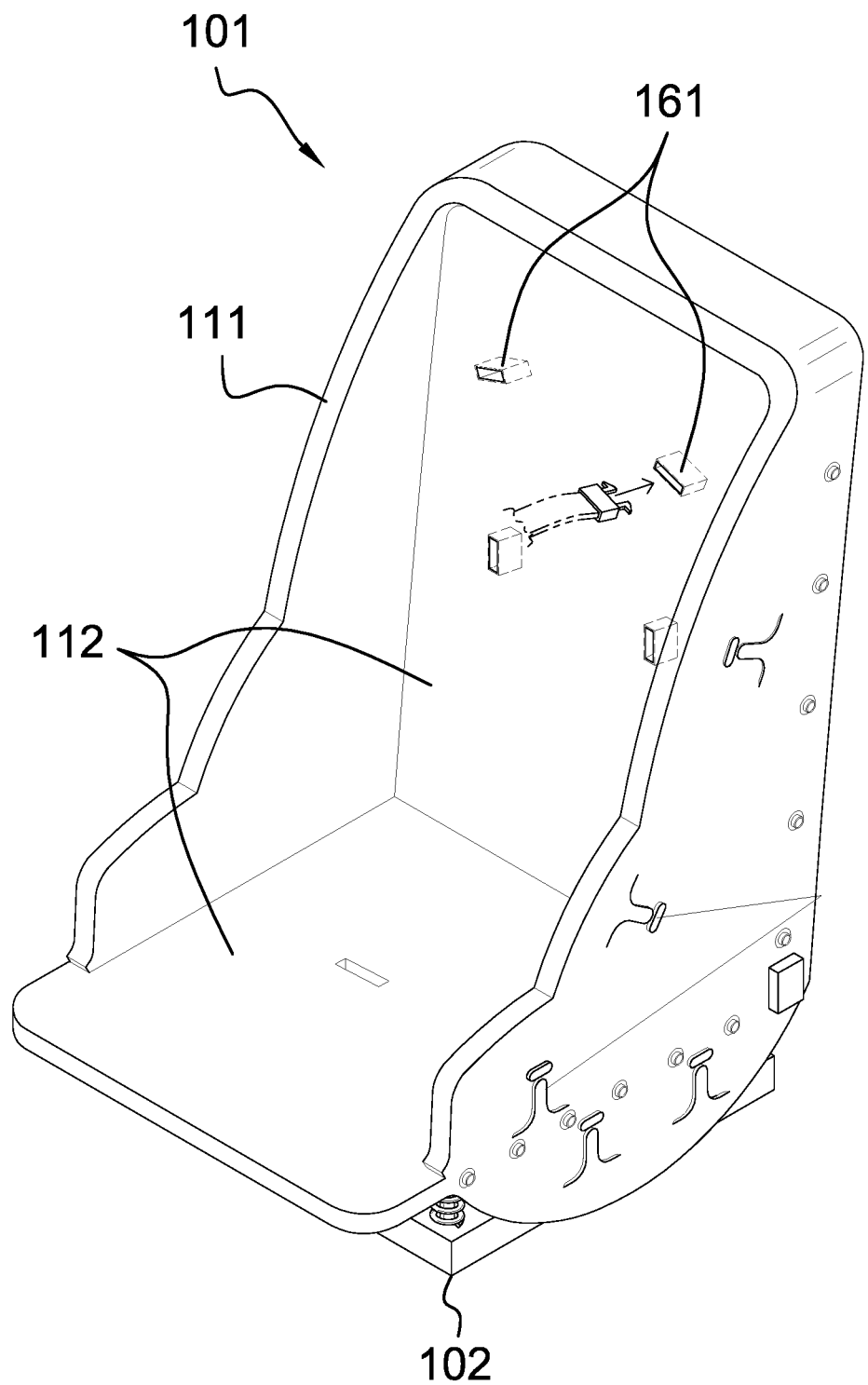
FIG. 3 is a perspective view of an embodiment of the disclosure.
Figure 4:
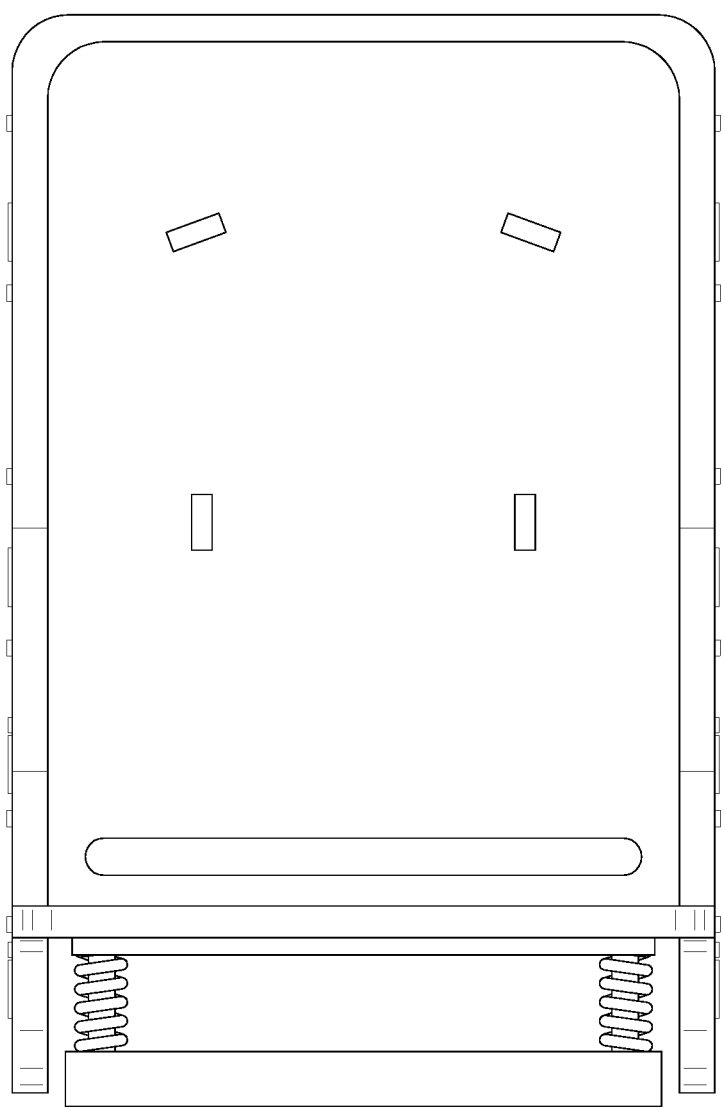
FIG. 4 is a front view of an embodiment of the disclosure.
Figure 5:
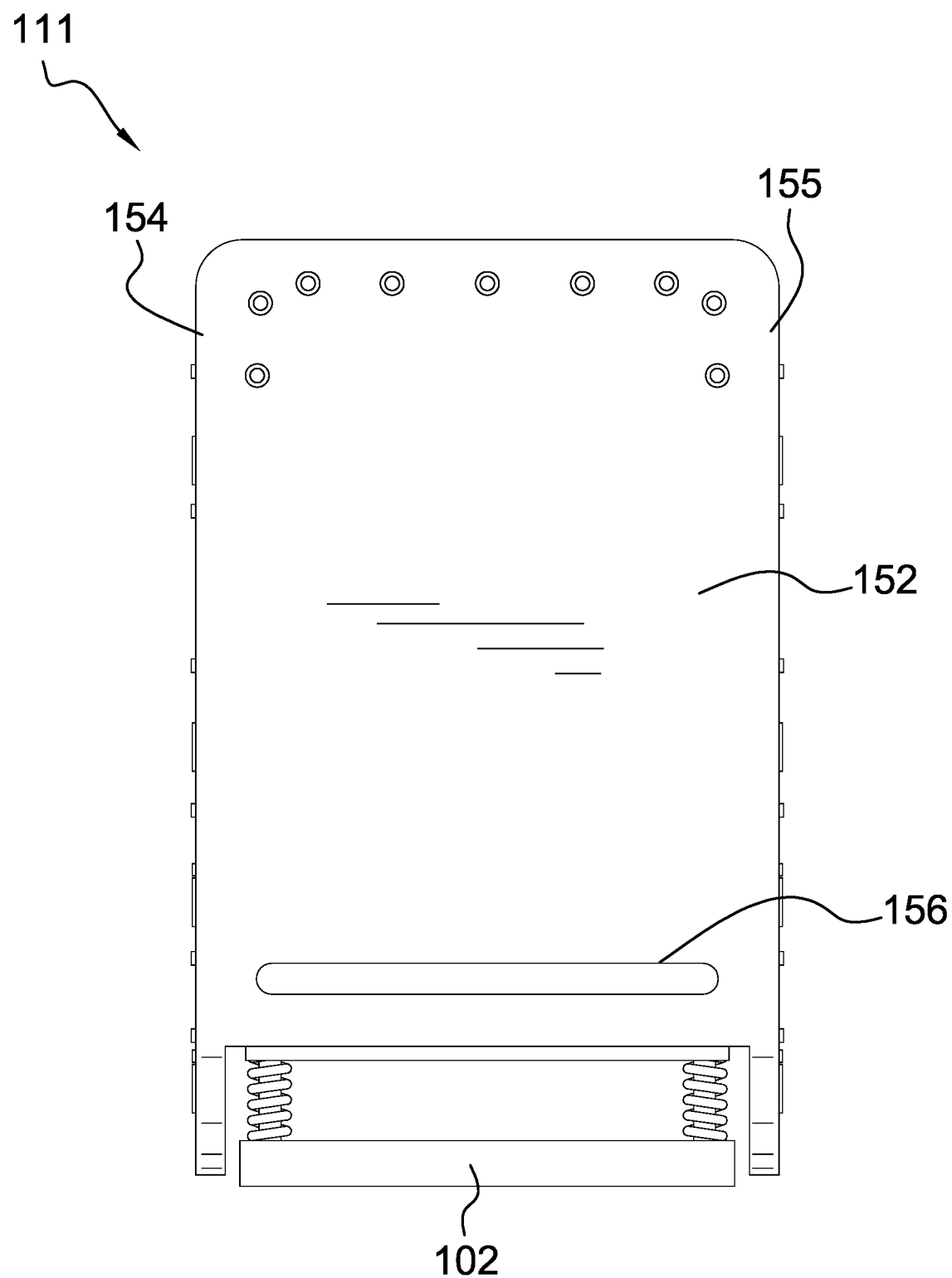
FIG. 5 is a rear view of an embodiment of the disclosure.
Figure 6:
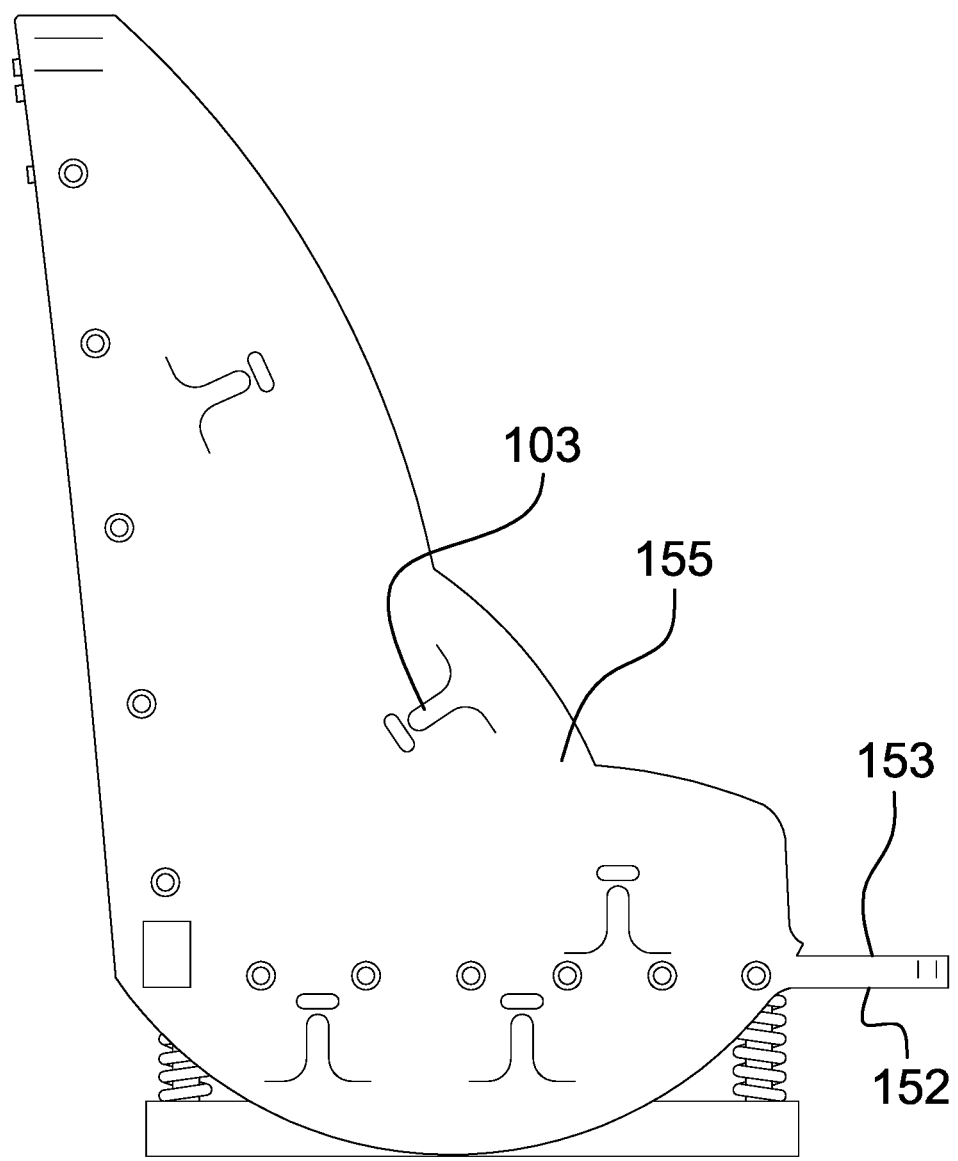
FIG. 6 is a right side view of an embodiment of the disclosure.
Figure 7:
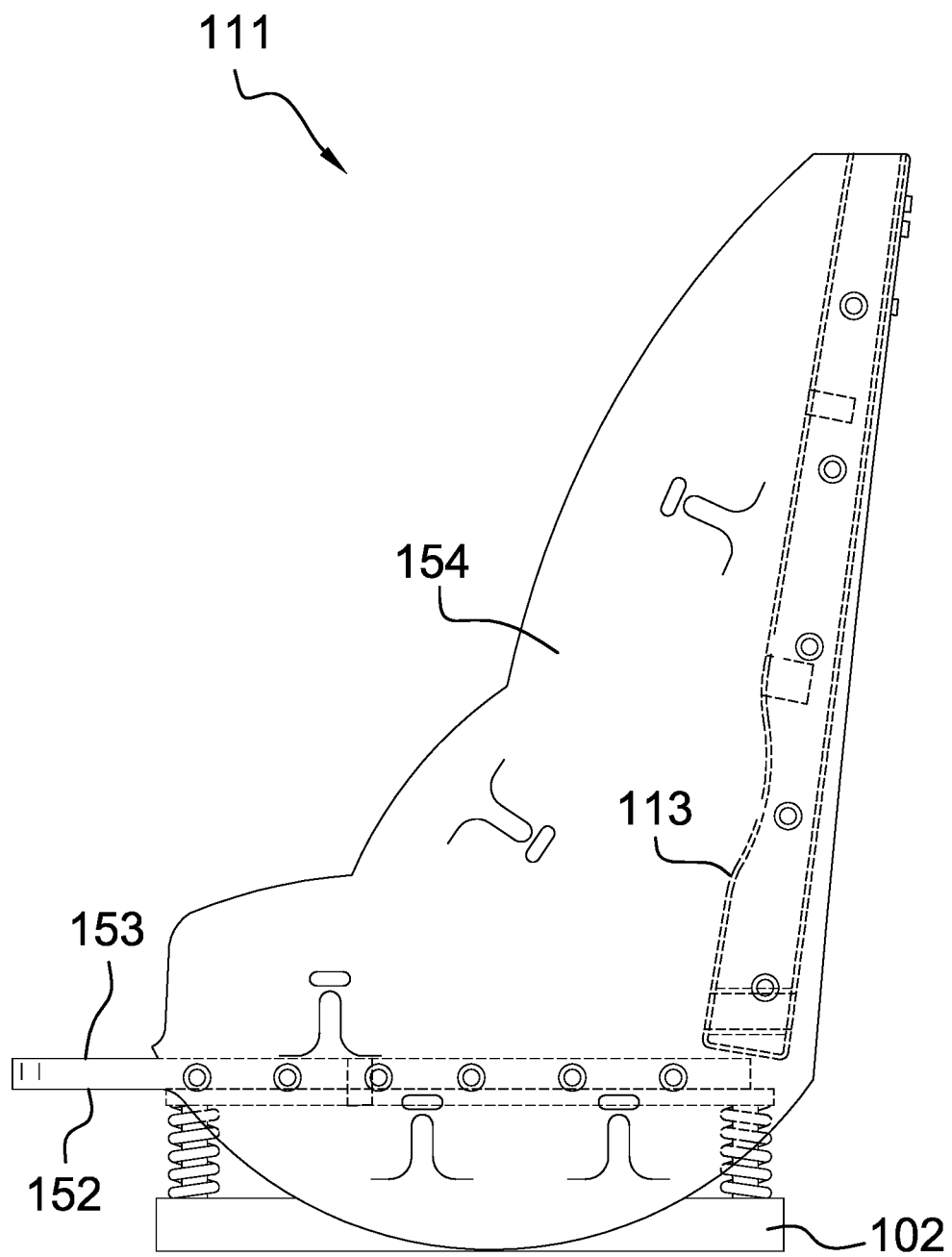
FIG. 7 is a left side view of an embodiment of the disclosure.
Figure 8:
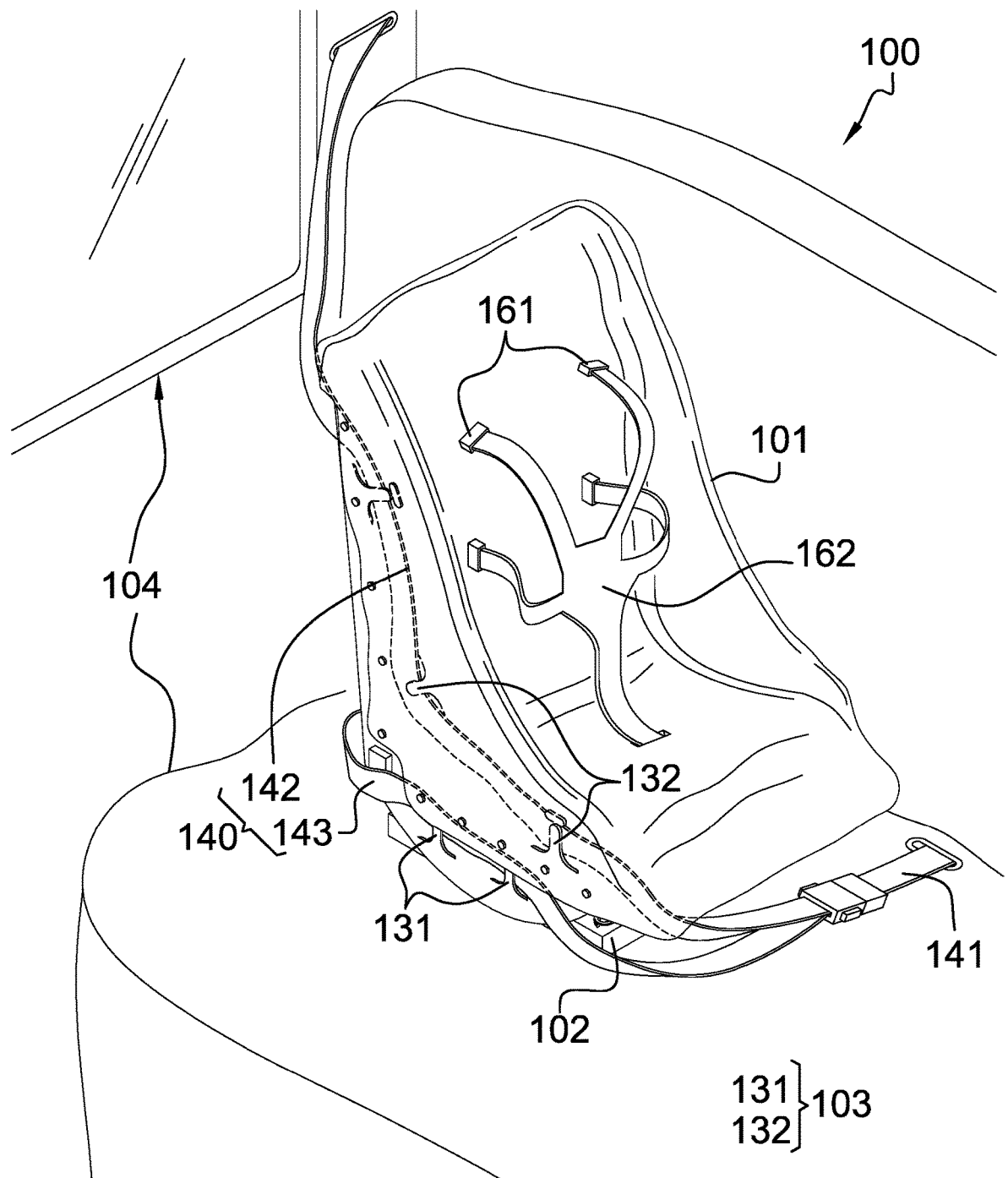
FIG. 8 is an in-use view of an embodiment of the disclosure.
Figure 9:
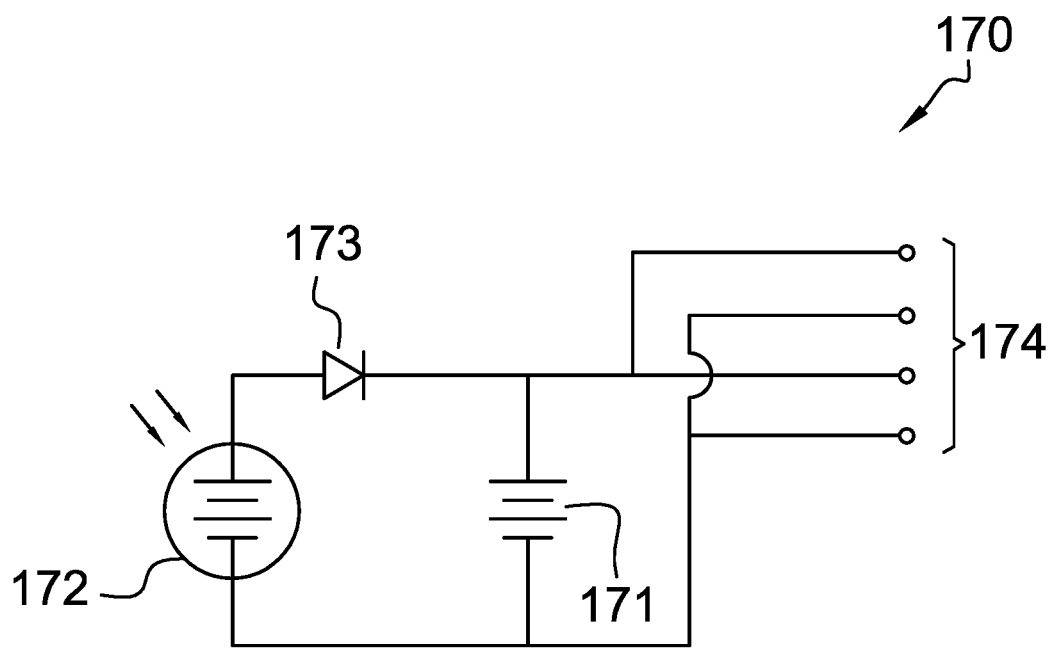
FIG. 9 is a schematic view of an embodiment of the disclosure.

Detailed reference will now be made to one or more potential embodiments of the disclosure, which are illustrated in FIGS. 1 through 11.

The child safety seat 100 (hereinafter invention) is a safety device. The invention 100 is used with an automobile 104. The invention 100 is adapted for use by a client 105. The client 105 is assumed to be a child such as an infant or a toddler. The client 105 sits in the invention 100 when travelling as a passenger in the automobile 104. The invention 100 protects the client 105 from injury when the automobile 104 is involved in an unfortunate event. The invention 100 mounts in the automobile 104 such that the transverse direction of the invention 100 is parallel to the coronal direction of the automobile 104. The invention 100 comprises a protective structure 101, a pedestal structure 102, an anchor structure 103, and the automobile 104. The pedestal structure 102 attaches to the protective structure 101. The anchor structure 103 secures the protective structure 101 to the automobile 104. The protective structure 101 forms a protected space in which the client 105 sits. The pedestal structure 102 adjusts the elevation of the protective structure 101.

The automobile 104 is defined elsewhere in this disclosure. The client 105 is defined elsewhere in this disclosure.

The automobile 104 further comprises a seat belt 141. The seat belt 141 is a harness device commonly referred to as a seat belt 141. The seat belt 141 is defined elsewhere in this disclosure. The seat belt 141 forms the anchor points that anchor the protective structure 101 to the automobile 104. The seat belt 141 further comprises a lap belt 142 and a shoulder strap 143. The lap belt 142 is a part of the harness apparatus formed by the seat belt 141. The lap belt 142 is defined elsewhere in this disclosure. The shoulder strap 143 is a part of the harness apparatus formed by the seat belt 141. The shoulder strap 143 is defined elsewhere in this disclosure.

The protective structure 101 is a mechanical structure. The protective structure 101 forms the protected space that the client 105 sits in. The protective structure 101 is a sacrificial structure that absorbs and dissipates impact energy that might otherwise injure the client 105. The protective structure 101 comprises a shell 111, a sacrificial liner 112, a cushion 113, a five point harness 114, a washable cover 115, and a power circuit 170.

The shell 111 is a mechanical structure. The shell 111 forms the exterior surfaces of the protected space formed by the protective structure 101. The shell 111 forms a trough like structure that the client 105 sits in. The shell 111 is a sacrificial structure that absorbs and dissipates impact energy that might otherwise injure the client 105. The shell 111 comprises a backrest 151, a left side wall 154, and a right side wall 155.

The backrest 151 is a non-Euclidean disk structure. The backrest 151 forms the inferior portion of the interior surface of the protected space formed by the protective structure 101. The backrest 151 forms a supporting surface on which the client 105 rests. The pedestal structure 102 attaches to the backrest 151. The backrest 151 further comprises a superior surface 152, an inferior surface 153, and a slotted opening 156.

The superior surface 152 is the congruent end of the non-Euclidean disk structure of the backrest 151 forms the inferior portion of the interior surface of the protected space formed by the protective structure 101. The superior surface 152 is the congruent end of the non-Euclidean disk structure of the backrest 151 that is proximal to the client 105. The inferior surface 153 is the congruent end of the non-Euclidean disk structure of the backrest 151 that attaches to the pedestal structure 102. The inferior surface 153 is the congruent end of the non-Euclidean disk structure of the backrest 151 that is distal from the superior surface 152.

The slotted opening 156 is a non-Euclidean disk-shaped negative space that is formed through the backrest 151 from the superior surface 152 to the inferior surface 153. The slotted opening 156 forms a grip structure that allows the invention 100 to be carried, moved, and manipulated.

The left side wall 154 is a vertically oriented barrier structure that forms the vertical boundaries of the protected space formed by the protective structure 101. The left side wall 154 attaches to the backrest 151 such that the left side wall 154 projects away from the superior surface 152 of the backrest 151. The left side wall 154 forms the left side of the protected space formed by the protective structure 101. The right side wall 155 is a vertically oriented barrier structure that forms the vertical boundaries of the protected space formed by the protective structure 101. The right side wall 155 attaches to the backrest 151 such that the right side wall 155 projects away from the superior surface 152 of the backrest 151. The right side wall 155 forms the right side of the protected space formed by the protective structure 101.

The sacrificial liner 112 is a mechanical structure. The sacrificial liner 112 is formed from a sacrificial material. The sacrificial liner 112 lines the interior surfaces of the shell 111 that form the protected space of the invention 100.

The cushion 113 is a padded structure on which the client 105 while sitting in the protective structure 101. The cushion 113 forms the surfaces of the protected space formed by the protective structure 101 that are proximal to the client 105. The cushion 113 rests on the sacrificial liner 112. The sacrificial liner 112 rests on the interior surfaces of the shell 111.

The five point harness 114 is a harness. The harness, including the five point harness 114 is defined elsewhere in this disclosure. The five point harness 114 secures the client 105 in the protected space formed by the protective structure 101. The five point harness 114 ensures that the client 105 remains in the protected space formed by the protective structure 101 during an unfortunate event. The five point harness 114 further comprises a plurality of harness anchors 161 and a harness structure 162.

Each of the plurality of harness anchors 161 forms an anchor point to which the harness structure 162. The plurality of harness anchors 161 permanently attach to the superior surface 152 of the backrest 151 of the shell 111. Each of the plurality of harness anchors 161 is identical. Each of the plurality of harness anchors 161 is formed from the second connector of a quick release buckle. The harness structure 162 is formed from a plurality of textile webbings and a plurality of first connectors from a quick release buckle. The textile portion of the harness structure 162 restrains the client 105 such that the client 105 remains in the protected space formed by the protective structure 101 during an unfortunate event. Each of the plurality of first components from a quick release buckle attaches to a harness anchor selected from the plurality of harness anchors 161 such that the five point harness 114 attaches to the shell 111 of the protective structure 101.

The washable cover 115 is a textile sheeting. The washable cover 115 removably attaches to the shell 111. The washable cover 115 encloses the interior surfaces of the protected space formed by the protective structure 101. The washable cover 115 forms a protective barrier that prevents the protected space formed by the protective structure 101 from stains and other discolorations caused by the client 105. The washable cover 115 is formed from a textile sheeting. The washable cover 115 further comprises a washable cover 115 fastening device 116.

The washable cover 115 fastening device 116 is a mechanical structure that removably attaches the washable cover 115 to the shell 111. The washable cover 115 fastening device 116 removably attaches the washable cover 115 to the exterior surface of the left side wall 154. The washable cover 115 fastening device 116 removably attaches the washable cover 115 to the exterior surface of the right side wall 155. The washable cover 115 fastening device 116 in the first potential embodiment of the disclosure, the washable cover 115 fastening device 116 comprises a plurality of snaps. The snap is defined elsewhere in this disclosure.

The power circuit 170 is an electrical circuit. The power circuit 170 powers through the plurality of USB ports 174. The power circuit 170 is an electrochemical device. The power circuit 170 converts chemical potential energy into the electrical energy required to power the plurality of USB ports 174. The power circuit 170 is an independently powered electric circuit. By independently powered is meant that the power circuit 170 can operate without an electrical connection to an external power source.

The battery 171 is an electrochemical device. The battery 171 converts chemical potential energy into the electrical energy used to power the plurality of USB ports 174. The battery 171 is a commercially available rechargeable battery 171. The photovoltaic cell 173 is an electrical device that converts light into electrical energy. The chemical energy stored within the rechargeable battery 171 is further renewed and restored through the use of the photovoltaic cell 173. The photovoltaic cell 173 is directly wired to the battery 171. The photovoltaic cell 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The diode 172 is an electrical device that allows current to flow in only one direction. The diode 172 installs between the rechargeable battery 171 and the photovoltaic cell 173 such that electricity will not flow from a first positive terminal of the rechargeable battery 171 into a second positive terminal of photovoltaic cell 173. The photovoltaic cell 173 is defined elsewhere in this disclosure.

Each of the plurality of USB ports 174 is an electric port that mounts on the protective structure 101 such that electric energy can be drawn from the power circuit 170 from any USB port selected from the plurality of USB ports 174. Each USB port selected from the plurality of USB ports 174 provides electric energy consistent with electric power distribution standards for a Universal Serial Bus (USB).

The pedestal structure 102 is a mechanical structure. The pedestal structure 102 attaches to the inferior surface 153 of the shell 111. The pedestal structure 102 transfers the load of the invention 100 and the client 105 to the automobile 104. The pedestal structure 102 generally sits on a seat of the automobile 104. The pedestal structure 102 forms the inferior load bearing structure of the invention 100. In the first potential embodiment of the disclosure, the pedestal structure 102 is formed with a plurality of springs that form a buffer that reduces the between the transfer of impulses between the protective structure 101 and the automobile 104.

The anchor structure 103 is a mechanical structure. The anchor structure 103 attaches to the exterior surface of a wall selected from the group consisting of the left side wall 154 and the right side wall 155. The anchor structure 103 removably attaches to the seat belt 141 of the automobile 104. The anchor structure 103 uses the seat belt 141 to anchor the invention 100 to the automobile 104 when the client 105 is sitting in the protected space. The anchor structure 103 comprises a plurality of lap belt 142 guide slots 131 and a plurality of shoulder strap 143 guide slots 132.

The plurality of lap belt 142 guide slots 131 comprises a first collection of guide slots. Each of the plurality of lap belt 142 guide slots 131 is formed in the exterior surface of a wall selected from the group consisting of the left side wall 154 and the right side wall 155. Each of the plurality of lap belt 142 guide slots 131 anchors the protective structure 101 to the lap belt 142 of the seat belt 141.

The plurality of shoulder strap 143 guide slots 132 comprises a second collection of guide slots. Each of the plurality of shoulder strap 143 guide slots 132 is formed in the exterior surface of a wall selected from the group consisting of the left side wall 154 and the right side wall 155. Each of the plurality of shoulder strap 143 guide slots 132 anchors the protective structure 101 to the shoulder strap 143 of the seat belt 141.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is often defined with a trunk. The trunk is an enclosed storage chamber formed within the automobile.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Buckle: As used in this disclosure, a buckle is a fastening device that is used for joining a first free end of a strap to a second free end of the same strap or a different strap. A buckle further comprises a first (also called the male) connector that is attached to the first free end and a second (also called the female) connector that is attached to the second free end. The male connector has a pin or other structure that is generally caught by a structure formed in the female connector.

Buffer: As used in this disclosure, a buffer is a dampening structure that connects a first device or structure to a second device or structure. The buffer is a compensating device that dampens the exchange of energy between the first device and the second device.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Chair: As used in this disclosure, a chair is a structure that a person can sit on. The horizontal resting surface a person sits on is called the bench. Seat is a common synonym for a chair.

Child Safety Seat: As used in this disclosure, a child safety seat is a safety device configured for use with an automobile. The child safety seat is a restraining device that protects a child from injury should an unfortunate event occur to the automobile. A booster seat refers to a child safety seat that is formed without a backrest. The booster seat acts as an intermediate safety device for a child that is too large to use a child safety seat but too small to safely use the seat belt system of a vehicle.

Client: As used in this disclosure, a client is an individual who is designated to receive the services of the disclosure at bar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Coronal Direction: As used in this disclosure, the coronal direction (or axis) is a direction defined by the axis of an object that is perpendicular in the transverse (posterior to anterior) direction and the sagittal (superior to inferior) direction. The coronal direction is the direction that moves from a first lateral side of the object to the second lateral side of the object (Stated less formally: the direction from the left to the right).

Correspond: As used in this disclosure, the term correspond is used as a comparison between two or more objects wherein one or more properties shared by the two or more objects match, agree, or align within acceptable manufacturing tolerances.

Cushion: As used in this disclosure, a cushion is a pad or pillow formed from soft material that is used for resting, sleeping, or reclining.

Dampening: As used in this disclosure, dampening refers to a structure that: a) reduces the tendency of an object or system to vibrate or oscillate; or, b) reduces the sensitivity of an object or system to impulses.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal: As used in this disclosure, distal refers to a directional sense or location of an object. Specifically, distal refers to a first object, or a side of a first object, that is distal from the medial axis, or more proximal to the side of the object, relative to a second object, or side of a second object.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Energy: As used in this disclosure, the energy is a term used in physics. Energy refers to the ability of a system to do work. Energy is a conserved property of a system. Energy is a quantifiable and is generally expressed in units of Joules.

External Power Source: As used in this disclosure, an external power source is a source of the energy that is externally provided to enable the operation of the present disclosure. Examples of external power sources include, but are not limited to, electrical power sources and compressed air sources.

Exterior: As used in this disclosure, the exterior is used as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has 5 anchor points.

Hydraulic: As used in this disclosure, hydraulic refers to a device wherein the movement of the device is powered using a fluid under pressure. The terms pneumatic and hydraulic can be used interchangeably.

Impact: As used in this disclosure, an impact refers to an exchange of momentum between two objects over a duration. An impact often refers to a collision between two objects.

Impulse: As used in this disclosure, an impulse refers to the release of energy over a relatively short period of time.

Infant: As used in this disclosure, an infant refers to a human child who: a) is under 18 months old; and, b) has not yet learned to walk.

Inferior: As used in this disclosure, the term inferior refers to a directional reference that is parallel to and in the same direction as the force of gravity when an object is positioned or used normally.

Instantiation: As used in this disclosure, an instantiation refers to a specific physical object or process that is created using a specification.

Interior: As used in this disclosure, the interior is used as a relational term that implies that an object is contained within the boundary of a structure or a space.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Lateral: As used in this disclosure, the term lateral refers to an axis of an object that is perpendicular in the transverse (posterior to anterior) direction and the sagittal (superior to inferior) direction. The distal surfaces of an object that intersect the lateral axis are often informally referred to as the "sides" of the object. The lateral axis is usually perpendicular to the primary sense of direction of the object. A lateral face refers to the surfaces of a prism structure that run between the congruent ends of the prism. Movement in a lateral direction is often called "sideways" movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Medial: As used in this disclosure, medial refers to a directional sense or location of an object. Specifically, medial refers to a first object or a side of a first object that is closer to the medial axis or more distal from the side of the object relative to a second object or side of a second object.

Medial Axis: As used in this disclosure, the medial axis is the center line of an object that is parallel to the sagittal direction. When two objects are compared relative to the medial axis, the object closer to the medial axis is referred to as the medial object and the object distal from the medial axis is referred to as the lateral object.

Momentum: As used in this disclosure, momentum is a measured quantity associated with the mass of a moving object. The momentum of the object equals the mass of the object multiplied by the velocity of the object. The exchange of momentum between two objects is a conserved quantity meaning that the sum of the momentums of the two objects before an exchange of momentum equals the sum of the momentums of the two objects after the exchange.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Pneumatic Cylinder: As used in this disclosure, a pneumatic cylinder is a telescopic composite prism structure. The telescopic nature of the pneumatic cylinder allows the span of the length of the composite prism structure of the pneumatic cylinder to be adjusted. The span of the length of the composite prism structure of the pneumatic cylinder is controlled by controlling the fluid pressure within the pneumatic cylinder.

Port: As used in this disclosure, a port is an electrical termination that is used to connect a first electrical circuit to a second external electrical circuit. In this disclosure, the port is designed to receive a plug.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a boundary structure, often referred to as a guard that prevents impacts from damaging the object contained within the protected space.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Rhombus: As used in this disclosure, a rhombus is a type of quadrilateral. The rhombus forms an enclosed two dimensional structure. The rhombus has four edges of equal length. The opposite internal angles of the vertices of the rhombus are equal. A diamond shape is considered a rhombus.

Rotation: As used in this disclosure, rotation refers to the cyclic movement of an object around a fixed point or fixed axis. The verb of rotation is to rotate.

Sacrificial Material: As used in this disclosure, a sacrificial material is a material that protects a first object or structure from damage. More specifically, the sacrificial material protects the second object or structure by being damaged during the use of the second object or structure.

Sacrificial Structure: As used in this disclosure, a sacrificial structure is a first object or structure that protects a second object or structure from damage. More specifically, the sacrificial structure protects the second object or structure by being damaged instead of the second object or structure.

Sagittal Direction: As used in this disclosure, the sagittal direction runs from the superior surface to the inferior surface of an object and is perpendicular to the coronal direction and the transverse direction.

Seat: As used in this disclosure, a seat is a structure that a person can sit on. Chair is a common synonym for a seat.

Seat Belt: As used in this disclosure, a seat belt refers to one of two harness systems that are used to secure a person into a fixed position within a vehicle. The harness structures of a seatbelt are selected from the group consisting of: a) a two point harness; and, b) a three point harness. A seat belt using a two point harness is called a lap belt. The lap belt is worn around the waist of the person wearing the lap belt. The strap of the lap belt is secured to the two anchor points using a seat belt buckle. A seat belt using a three point harness is a lap belt that adds a third anchor point to the lap belt that is located above the shoulder of the person wearing the seat belt. The third anchor point secures a strap, known as the shoulder strap, across the torso of the person wearing the seatbelt. The shoulder strap is anchored from the third anchor point to one of the two anchor points used to form the lap belt. The shoulder strap in a land vehicle, such as an automobile, will typically be secured to the lap belt by attaching to the seat buckle.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Snap: As used in this disclosure, a snap is a fastener that comprises a first component and a second component. The snap is engaged by inserting the first component into the second component. The first component and the second component of the snap are often referred to as the male component into the female component.

Strap: As used in this disclosure a strap is a strip of leather, cloth, or other flexible material, often with a buckle, that is used to fasten, secure, carry, or hold onto something.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Textile: As used in this disclosure, a textile is a material that is woven, knitted, braided or felted. Synonyms in common usage for this definition include fabric and cloth. The two surfaces of the textile with the greatest surface area are called the faces of the textile.

Toddler: As used in this disclosure, a toddler is a human child between the ages of one and three who has learned to walk.

Transverse Direction: As used in this disclosure, the transverse direction runs from the anterior surface to the posterior surface of an object and is perpendicular to the coronal direction and the sagittal direction Unfortunate Event: As used in this disclosure, an unfortunate event is an incident that: a) happens unexpectedly; b) happens unintentionally; and, c) has the potential to cause injury and or property damage.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A child safety seat comprising
a protective structure, a pedestal structure, an anchor structure, and an automobile;
wherein the pedestal structure attaches to the protective structure;
wherein the anchor structure secures the protective structure to the automobile;
wherein the child safety seat is adapted for use by a client;
wherein the client sits in the child safety seat when traveling as a passenger in the automobile;
wherein the protective structure comprises a shell, a sacrificial liner, a cushion, a five point harness, a washable cover, and a power circuit;
wherein the cushion rests on the sacrificial liner;
wherein the sacrificial liner rests on the interior surfaces of the shell;
wherein the five point harness secures the client in the protected space formed by the protective structure;
wherein the washable cover encloses the interior surfaces of the protected space formed by the protective structure;
wherein the washable cover further comprises a washable cover fastening device;
wherein the washable cover fastening device is a mechanical structure that removably attaches the washable cover to the shell;
wherein the sacrificial liner is a mechanical structure;
wherein the sacrificial liner is formed from a sacrificial material;
wherein the sacrificial liner lines the interior surfaces of the shell that form the protected space of the child safety seat;

wherein the cushion forms the surfaces of the protected space formed by the protective structure that are proximal to the client.

2. The child safety seat according to claim 1 wherein the child safety seat mounts in the automobile such that the transverse direction of the child safety seat is parallel to the coronal direction of the automobile.

3. The child safety seat according to claim 2
wherein the protective structure forms a protected space in which the client sits;
wherein the pedestal structure adjusts the elevation of the protective structure.

4. The child safety seat according to claim 3
wherein the automobile further comprises a seat belt;
wherein the seat belt is a harness device;
wherein the seat belt further comprises a lap belt and a shoulder strap.

5. The child safety seat according to claim 4
wherein the protective structure is a mechanical structure;
wherein the protective structure forms the protected space that the client sits in;
wherein the protective structure is a sacrificial structure that absorbs and dissipates impact energy that might otherwise injure the client.

6. The child safety seat according to claim 5
wherein the pedestal structure is a mechanical structure;
wherein the pedestal structure transfers the load of the child safety seat and the client to the automobile;
wherein the pedestal structure generally sits on a seat of the automobile;
wherein the pedestal structure forms an inferior load bearing structure of the child safety seat.

7. The child safety seat according to claim 6
wherein the anchor structure is a mechanical structure;
wherein the anchor structure removably attaches to the seat belt of the automobile;
wherein the anchor structure uses the seat belt to anchor the child safety seat to the automobile when the client is sitting in the protected space.

8. The child safety seat according to claim 7
wherein the anchor structure attaches to the exterior surface of a wall selected from the group consisting of the left side wall and the right side wall;
wherein the anchor structure comprises a plurality of lap belt guide slots and a plurality of shoulder strap guide slots;
wherein each of the plurality of lap belt guide slots is formed in the exterior surface of a wall selected from the group consisting of the left side wall and the right side wall;
wherein each of the plurality of lap belt guide slots anchors the protective structure to the lap belt of the seat belt;
wherein each of the plurality of shoulder strap guide slots is formed in the exterior surface of a wall selected from the group consisting of the left side wall and the right side wall;
wherein each of the plurality of shoulder strap guide slots anchors the protective structure to the shoulder strap of the seat belt.

9. The child safety seat according to claim 8
wherein the shell is a mechanical structure;
wherein the shell forms the exterior surfaces of the protected space formed by the protective structure;
wherein the shell is adapted for the client to be seated there;
wherein the shell is a sacrificial structure.

10. The child safety seat according to claim 9
wherein the shell comprises a backrest, a left side wall, and a right side wall;
wherein the left side wall and the right side wall attach to the backrest.

11. The child safety seat according to claim 10
wherein the backrest forms a supporting surface that is adapted for the client to rest thereon;
wherein the pedestal structure attaches to the backrest;
wherein the backrest further comprises a superior surface, an inferior surface, and a slotted opening;
wherein the slotted opening is a negative space that is formed through the backrest from the superior surface to the inferior surface;
wherein the slotted opening forms a grip structure that allows the child safety seat to be carried, moved, and manipulated.

12. The child safety seat according to claim 11
wherein the left side wall is a vertically oriented barrier structure that forms the vertical boundaries of the protected space formed by the protective structure;
wherein the left side wall attaches to the backrest such that the left side wall projects away from the superior surface of the backrest;
wherein the left side wall forms the left side of the protected space formed by the protective structure;
wherein the right side wall is a vertically oriented barrier structure that forms the vertical boundaries of the protected space formed by the protective structure;
wherein the right side wall attaches to the backrest such that the right side wall projects away from the superior surface of the backrest;
wherein the right side wall forms the right side of the protected space formed by the protective structure.

* * * * *